BURTON & HOIT.
Plow.
No. 51,917. Patented Jan. 9, 1866.
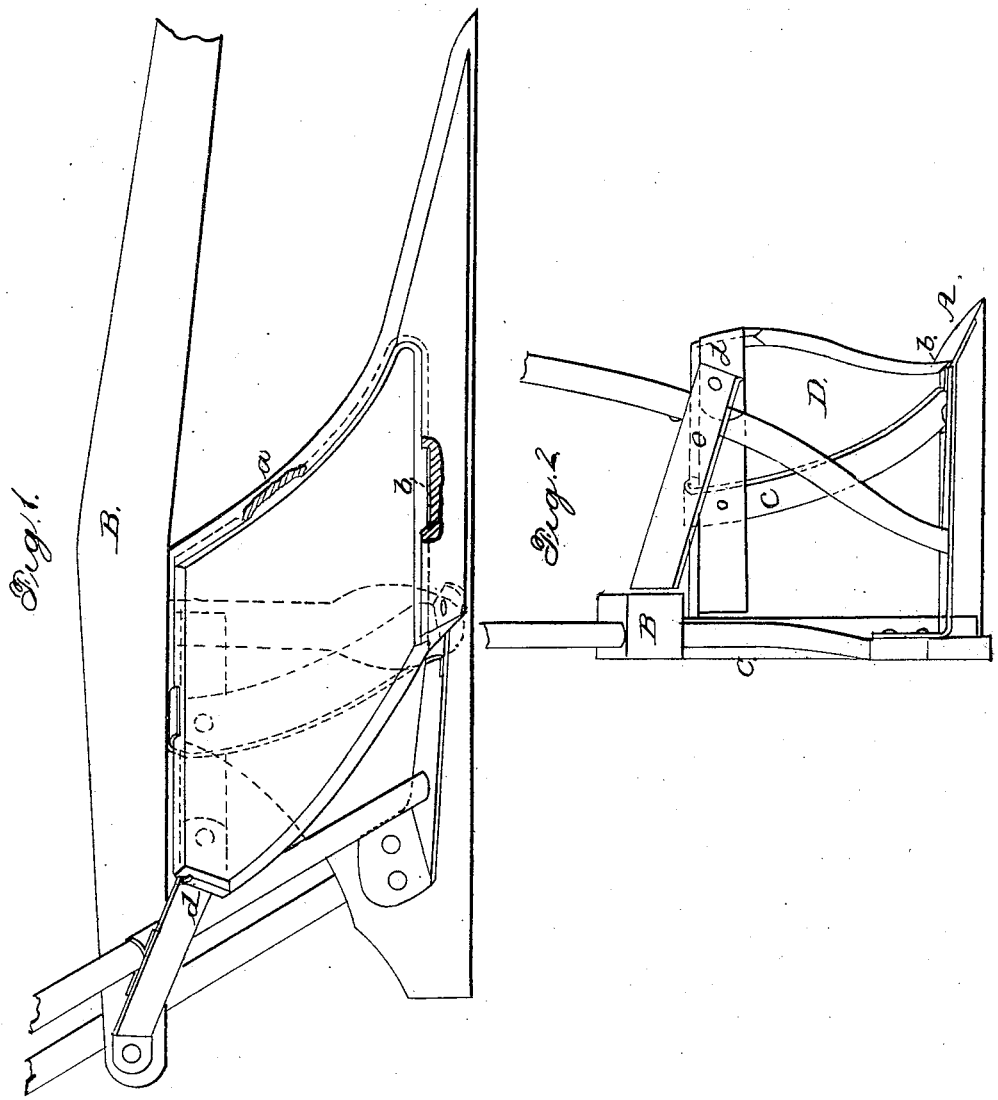
WITNESSES:
J. H. Phillips
Geo C Lambright
INVENTORS
Oscar F Burton
L B Hoit

United States Patent Office.

OSCAR F. BURTON, OF NEW YORK, N. Y., AND LORA B. HOIT, OF CEDAR FALLS, IOWA.

IMPROVEMENT IN PLOWS.

Specification forming part of Letters Patent No. 51,917, dated January 9, 1866.

*To all whom it may concern:*

Be it known that we, OSCAR F. BURTON, of 233 Broadway, in the city, county, and State of New York, and LORA B. HOIT, of Cedar Falls, in the county of Black Hawk and State of Iowa, have invented a new and useful Improvement in Plows; and we do hereby declare that the following is a full, clear, and exact description thereof, which will enable those skilled in the art to make and use the same, reference being had to the accompanying drawings, forming part of this specification.

Figure 1 represents a side elevation. Fig. 2 is an end view of the same.

Similar letters of reference indicate corresponding parts.

This invention consists in making the mold-board of a plow of glass, curved to assume the requisite form, and fastened to the beam and standard in such a manner that a mold-board is obtained which is not liable to tarnish or become rough by the influence of moisture or by the action of the soil, and to which the soil does not adhere, thus producing a plow which passes easily through the ground and turns the same over without fail.

For the purpose of fastening the mold-board, V-shaped grooves are made in the upper and inner edge of the plowshare, and suitable clamps are applied, one extending over its top edge and one over its outer corner in such a manner that the same is held securely in place and its smooth surface is preserved throughout.

A represents the plowshare, which is secured to the beam B and standard C in the usual manner. The upper and inner edges *a b* of this share are V-shaped, to receive the mold-board D, which is made of glass, in any suitable manner, and the edges of which are ground off or otherwise so shaped that they correspond to the V-shaped grooves in the plowshare. A clamp *c*, catches over the top edge of the mold-board and holds it down, and another clamp or brace, *d*, bears against its upper corner, which is flattened for this purpose, so that the brace has a firm bearing against it. By the action of these two clamps the mold-board is held firmly in its place, and its smooth surface is preserved throughout, which could not be done if the same were fastened by screw-bolts passing through it.

By the use of glass a mold-board is obtained to which the soil does not adhere, and which, therefore, passes easily through the soil and turns it over without fail.

Our mold-board can be made cheap, at a less cost than an ordinary mold-board of steel. It is durable, and works much easier than any mold-board known to us.

Having thus described our invention, we claim as new and desire to secure by Letters Patent—

1. Making the mold-board of a plow entirely of glass, substantially as and for the purpose described.

2. The combination of clamps *c d* and V-shaped grooves *a b*, for the purpose of attaching the mold-board D without bolts or screws, substantially as and for the purpose set forth.

OSCAR F. BURTON.
L. B. HART.

Witnesses:
EDM. F. BROWN,
C. BESTOR.